United States Patent [19]

Kraus et al.

[11] 4,086,820
[45] May 2, 1978

[54] INFINITELY VARIABLE TRACTION ROLLER TRANSMISSION

[75] Inventors: Charles E. Kraus; James Hume Kraus, both of Austin, Tex.

[73] Assignee: Excelermatic, Inc., Austin, Tex.

[21] Appl. No.: 699,181

[22] Filed: Jun. 25, 1976

[51] Int. Cl.² .................. F16H 15/10; F16H 15/12; F16H 15/38

[52] U.S. Cl. .................................................. 74/200

[58] Field of Search .................... 74/200, 201, 198

[56] References Cited

U.S. PATENT DOCUMENTS

| | | | |
|---|---|---|---|
| 3,345,882 | 10/1967 | Armstrong | 74/200 |
| 3,413,864 | 12/1968 | Magill et al. | 74/200 |
| 3,596,467 | 8/1971 | Avery | 74/200 |
| 3,802,284 | 4/1974 | Sharpe et al. | 74/200 |
| 3,810,398 | 5/1974 | Kraus | 74/200 |
| 3,826,147 | 7/1974 | Sharpe et al. | 74/200 |
| 3,826,148 | 7/1974 | Magill | 74/200 |

*Primary Examiner*—Samuel Scott
*Assistant Examiner*—W. R. Henderson

[57] ABSTRACT

A rotary motion transmitting device having oppositely disposed toric discs mounted on its input and output shafts. Motion transmitting rollers are frictionally engaged between the toric discs for transmitting motion from one toric element to the other and tension sheets extend between opposite rollers to balance forces exerted on the rollers. Pivotal roller supports are interconnected by correlating means which point limited independent pivotal movement of the roller supports while resiliently forcing the supports into the same angular positions. Also means are provided for controlling the transmission ratio such that the output torque assumes a desired value.

15 Claims, 5 Drawing Figures

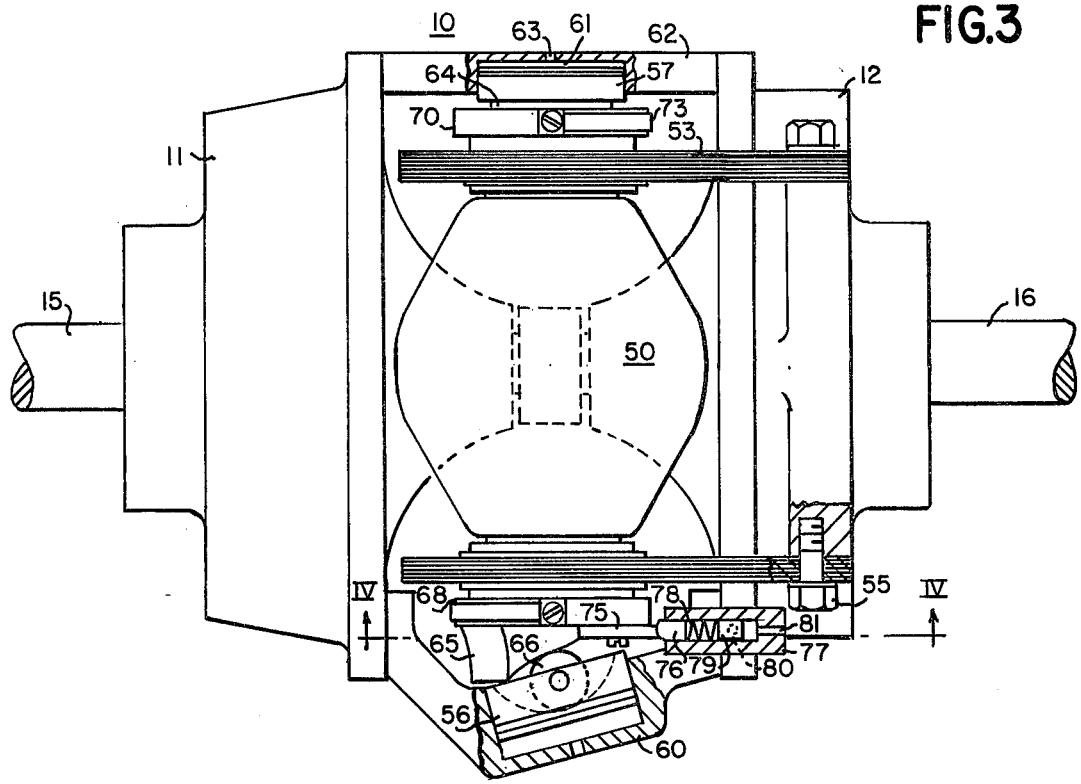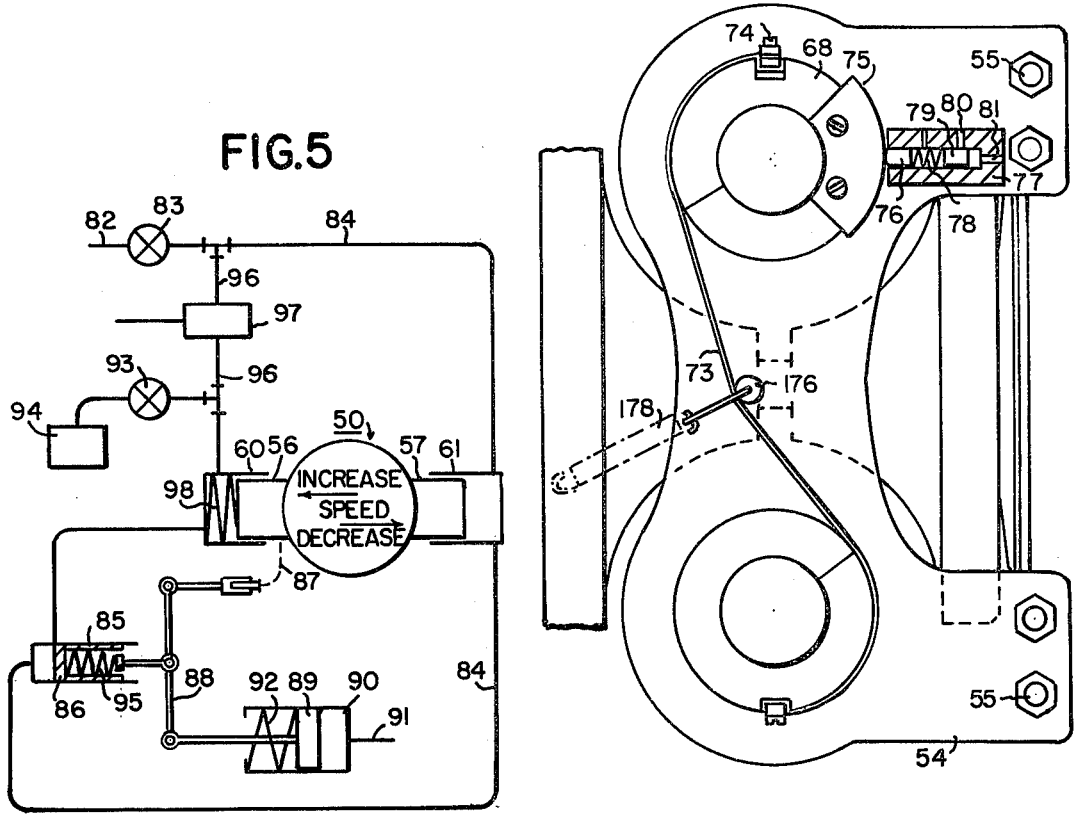

INFINITELY VARIABLE TRACTION ROLLER TRANSMISSION

BACKGROUND OF THE INVENTION

The invention relates to infinitely variable traction roller transmissions in which motion is transmitted from a toric disc mounted on an input shaft to a toric disc mounted on an output shaft by traction rollers disposed between and in engagement with the toric discs.

To enable such toroidal traction roller transmissions to transmit large torques at high speeds for long life the traction rollers are positioned inwardly of the center of the toroidal cavity between the toric discs. Such an arrangement causes relatively little spin in the contact area of the traction rollers with the toric discs so that a relatively high traction coefficient and relatively little wear on the surfaces of the toric discs and the traction rollers are obtained. The contact forces necessary for engagement of the traction rollers with the toric discs are obtained by forcing the toric discs toward each other. This, however, results in a large axial thrust load of the traction rollers which is carried on to axial thrust bearings supported by the housing of the rotary motion transmitting device as shown for example in U.S. Pat. No. 3,299,744. In such arrangements, the housings do not only have to take up the bearing forces, but a large amount of vibrations is also carried from the traction rollers into the housings. Furthermore, the transmission ratio control arrangements for such devices include mechanical actuating means, which also carry noises and vibrations to the housing. The positioning controls for the rollers are usually interconnected thereby causing backlash, deflections and undampened movements that interfere with balanced operation.

In the present inventor's earlier U.S. Pat. No. 3,810,398 a rotary motion transmitting device is provided in which the support structures of the power rollers are interconnected by tension means which extend between the toric discs and balance the forces and vibrations exerted on the power rollers while allowing nearly friction free transverse motion of the roller assemblies for transverse shifting of the roller assembly for transmission ratio changing pivoting of the roller support structure. The traction roller positions are controlled independently so that very little noise and vibration is carried into the housing. However, under cold operating conditions the transmission fluid has a relatively high viscosity so that the forces engaging the traction rollers are not sufficient to squeeze out the transmission fluid film. As a result, hydroplaning may occur which may cause the power rollers to move out of their desired relative positions that is out of the same circles of contact with the toric discs.

SUMMARY OF THE INVENTION

In an infinitely variable traction roller transmission in which the power transmitting traction rollers are disposed between toric discs carried by input and output shafts the toric discs are forced toward each other and in frictional engagement with the traction rollers. The traction rollers are mounted on pivotal support structure to permit change of the transmission ratio. Correlating means are provided which interconnect the pivotal support structures for common pivoting in opposite direction which correlating means, however, permit limited independent pivotal movement, while resiliently drawing the support structures into the same angular positions and accordingly the traction rollers into the same circles of contact with the toric discs. Also, means are provided for controlling the transmission ratio such that the output torque assumes a desired value.

BRIEF DESCRIPTION OF THE DRAWINGS

FIG. 3 is a top view of the pivoting arrangement for the pivot shafts supporting the power rollers as shown in FIG. 2.

FIG. 4 is a view along line IV—IV of FIG. 3; and,

FIG. 5 shows schematically a hydraulic control arrangement for controlling the operation of the transmission.

DESCRIPTION OF THE PREFERRED EMBODIMENT

Figure 1:
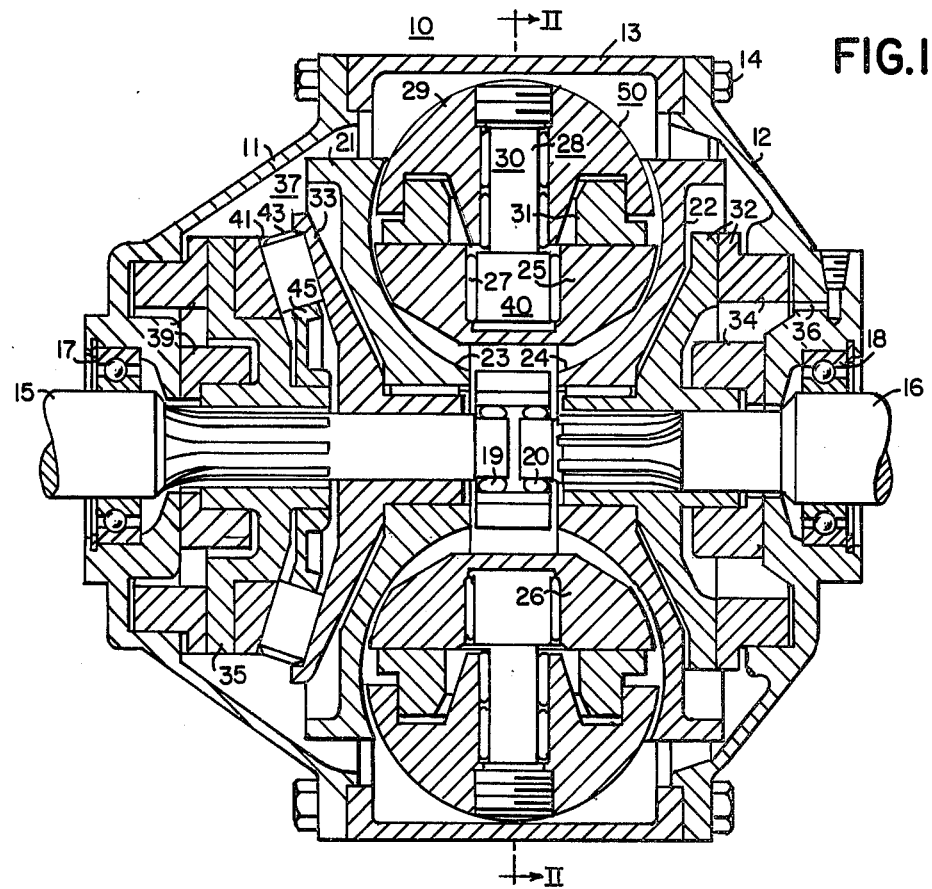
FIG. 1 is a cross-sectional view of the motion transmitting device showing the general arrangement of the elements of the device.

As shown in FIG. 1, the rotary motion transmitting device comprises a housing 10 consisting of a central part 13, a front part 11 disposed at one end of the central part 13 and a rear part 12 disposed at the opposite end of the central part 13. The housing parts 11, 12 and 13 are held together as by tension bolts 14. Coaxial input and output shafts 15 and 16 extend through the front and the rear parts 11 and 12 of the housing 10 and are rotatably supported by input and output shaft bearings 17 and 18 and by central support bearings 19 and 20, or alternatively, one shaft may extend into a central bore in the other shaft to be supported therein.

The input shaft 15 carries an input traction disc 21 and the output shaft 16 carries an output traction disc 22 disposed opposite the input traction disc. The traction discs 21 and 22 have opposite toroidal surfaces 23 and 24 and are adapted to engage therebetween power rollers 25 and 26 for the transmission of motion from the input traction disc to the output traction disc. The power rollers 25 and 26 are supported by bearings 27 on a shaft 28 journalled in a roller support structure 29. The shaft 28 has eccentric bearing portion 30 and 40 to permit slight movement of the rollers in a direction normal to the shaft when necessary for firm engagement with the input and output traction discs. Axial support is provided for the power rollers 25 and 26 by axial thrust bearings and seal assemblies 31 preferably of the type as described in applicant's earlier U.S. Pat. No. 3,788,713 issued Jan. 29, 1974 or in U.S. Pat. No. 3,486,391.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22.

The input traction disc 21 is mounted on an axial input thrust member 33 which is freely rotatable on the input shaft 15 and together with an axial pressure plate 35 forms a load cam structure 37 for forcing the input traction disc 21 toward the output traction disc 22 and both discs into engagement with the power rollers when a torque is transmitted through the transmission. Adjacent the input thrust member 33, the pressure plate 35 has cam faces 41 with cam rollers 43 disposed between the thrust member 33 and the cam faces 41 to be wedged therebetween when a torque is applied to the input shaft. The rollers 43 are held in position by a cage 45. The pressure plate 35 is mounted on the input shaft 15 for rotation therewith and axially supported by the hydrostatic axial thrust bearing 39 disposed between the pressure plate 35 and the housing part 11. The hydrostatic axial thrust bearings 39 and 34 are preferably of the type described in the present inventor's earlier U.S. Pat. No. 3,788,713. Hydraulic fluid is supplied to the bearings through passages 36 as shown in FIG. 1 only for bearing 34.

Figure 2:
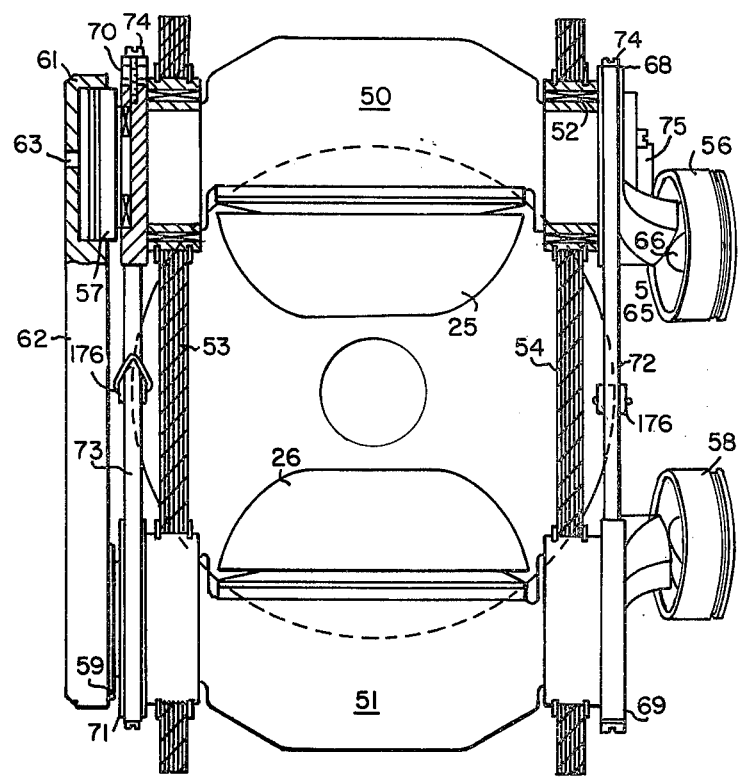
FIG. 2 is essentially a cross-sectional view along lines II—II of FIG. 1 showing the suspension arrangement for the roller support structure without the housing.

The roller pivot structure 29 is more clearly shown in FIGS. 2 and 3. The rollers 25 and 26 are supported in the housing 10 by pivot shafts 50 and 51 which are disposed in radial symmetry with respect to the input and output shafts, that is, with two rollers, diametrically opposite each other and supported by radial bearings 52 on tension sheets 53 and 54 which take up the radial bearing load as caused by the contact forces of the rollers 25 and 26. The contact forces of both opposite power rollers 25 and 26 are the same and the radial resultants directed in opposite direction are balanced by the tension sheets so that the housing 10 is not subjected to such forces and to vibrations as caused by the power rollers 25, 26.

The tension sheets 53 and 54 preferably consist of laminated steel leaves with sheets of plastic material disposed between the steel leaves. Each of the tension sheets 53 and 54 is preferably U-shaped and anchored to the housing as by bolts 55 so that slight movement of the power rollers in axial direction of the pivot shafts is possible, to facilitate changing of the transmission ratio.

As is known in the art, changing of the transmission ratio is effected by changing the angular position of the pivot shafts and, in accordance therewith, the circles of engagement of the input and output traction discs with the traction rollers. A change of the transmission ratio is obtained by axially moving the pivot shafts 50 and 51 in the same sense with regard to the traction surfaces of the toroidal discs 21 and 22 that is, by moving the opposite pivot shafts 50 and 51 slightly in opposite directions. Such axial movement of the pivot shafts 50 and 51 is achievable by pistons 56 and 57, 58 and 59 arranged at opposite ends of the pivot shafts 50 and 51 and disposed in cylinders 60 and 61 (shown only for pivot shaft 50). The arrangement is the same for both pivot shafts and is therefore described only with regard to pivot shaft 50.

The cylinder 61 is formed in a housing end plate 62 provided with a nozzle 63 for the admission of hydraulic fluid for operating the piston 57. An axial thrust bearing 64 is disposed between the piston 57 and the pivot shaft 50 to permit transmission of axial forces between the piston 57 and the pivot shaft 50.

At the opposite end the pivot shaft 50 is provided with a precess cam 65 and the piston 56 is provided with a roller 66 seating on the precess cam 65. Preferably, the piston 56 and cylinder 60 are so arranged that their axis is not parallel to the pivot axis of the pivot shaft but essentially normal to the cam surface so that no side forces are effective on the piston 56 to avoid tilting of the piston 56 and wear.

The pivot shafts 50 and 51 have flanges 68, 69, 70 and 71 arranged in planes normal to the axes of the pivot shafts 50 and 51 and aligned, and flexible bands or cables 72 and 73 are connected to the respective flanges of opposite pivot shafts by fastening means such as bolts 74. The two bands 72, 73 extend around the flanges 68, 70 of one of the pivot shaft 50 in opposite directions and crossover to the opposite pivot shaft 51 where they extend around the respective flanges 69, 71 in a direction opposite to that in which they extend around the respective flanges 68, 70 of shaft 50, so that movement of one of the pivot shafts in one sense causes movement of the other pivot shaft in the opposite sense. The bands 72 and 73 however are not tensioned but are connected with a certain slack so that limited independent pivoting of the pivot shafts is possible. The slack, nevertheless, is resiliently taken up by tensioned guides such as tension rollers 176 providing a tensioning force by tensioning springs 178 hooked thereto. The tensioning springs 178 provide opposed torque forces on the pivot shafts which forces are balanced in the proper relative positions of the pivot shaft but they will permit pivoting of the pivot shafts out of their relative positions within the limits given by the slack provided for the flexible bands.

The position of the pivot shafts is hydraulically controlled by the amount of pressure applied to pistons 56 and 57 and 59 and 58 respectively. The position signals for the hydraulic positioning control arrangement is supplied by a cam and piston arrangement wherein the cam 75 is mounted on flange 68 for rotation with the pivot shaft 50 and the piston 76 is disposed in a cylinder 77. In combination with spring 78 and control valve piston 79 the cam and piston arrangement can provide a predetermined output torque for the transmission by releasing pressure in the control circuit through discharge opening 80 wherein the pressure in the valve supply line 81 increases beyond a predetermined value sufficient to move the control piston 79 against the spring 78 to open discharge opening 80. The pressure of the spring 78 on the other hand is modulated by the cam 75 depending on the position of the pivot shaft 50 to provide for the proper pressure limit of the hydraulic fluid for a predetermined output torque limit.

In FIG. 5 which shows the hydraulic control arrangement for the transmission, the transmission's pivot shaft 50 is shown only schematically indicating for piston and cylinder arrangements 56, 60 and 57, 61 that movement of piston 56 into cylinder 60 and movement of piston 57 out of cylinder 61 causes an increase of the transmission speed ratio that is an increase of the speed of the output shaft with respect to the input shaft. In order to make sure that the transmission speed ratio is returned to the lowest output shaft speed transmission ratio, a spring 98 may be disposed in cylinder 60 or other means may be provided, such as an increased piston area for piston 56 which tends to move the pivot shaft toward the lowest output shaft speed transmission ratio position. The positioning of the pivot shaft during operation is controlled by admission of pressurized fluid to cylinders 60 and 61. The supply of pressurized fluid from supply line 82 is limited by orifice 83 and is applied through connecting line 84 to cylinder 61 and to a control cylinder 85 including a valve piston 86 which controls the admission of pressurized fluid to cylinder 60. The piston 86 is operatively connected to a transmission ratio position operating member 87 (which may be cam 75 of FIGS. 3, 4) by a lever 88 to which also a control piston 89 is linked which control piston 89 is movably disposed in a cylinder 90. Pressurized fluid can be applied to the piston 89 through fluid line 91 to move the piston 89 against the force of a spring 92 to pivot lever 88 and move valve piston 86 in a closing direction in which admission of pressurized fluid to cylinder 60 is interrupted. However, the fluid in cylinder 60 is permitted to flow through drain orifice 93 to the drain 94 so that the pivot shaft 50 is moved into speed-up precessing position by the pressurized fluid in cylinder 61.

The pressure difference maintained in cylinders 60 and 61 depends, during normal operation, basically on the torque transmitted by the traction rollers 25, 26 from one of the toric discs 21 to the other 22. Therefore, if overloading of the traction rollers is to be prevented the torque transmitted by the traction rollers must not exceed a predetermined value. This can be achieved by simply limiting the pressure difference maintained in cylinders 60 and 61.

For some applications, however, it is necessary to provide a constant output torque for the output shaft 16 which output torque is independent of the speed of the output shaft or a predetermined torque pattern dependent on the output shaft speed. Obviously, the output shaft torque depends on the transmission ratio setting and therefore the maximum pressure difference applied in cylinders 60 and 61 is also dependent on the transmission ratio setting. To adjust the pressure differentials of cylinders 60 and 61 to transmission ratio changes, lever 88 is connected to transmission ratio indicator 87. At an output speed, for example, where the torque transmitted through the traction rollers is low, lever 88 is moved by indicator 87 in a direction to provide less tension for spring 95 (that is toward the right in FIG. 5) so that a lower pressure is obtained in cylinder 61 in opposition to the pressure in cylinder 60. If the torque to be transmitted through the traction rollers for providing the same output shaft torque is high as during high output shaft speeds, lever 88 is moved by operating member 87 in the opposite direction thereby to increase the tension of spring 95 and requiring increased pressure in cylinder 85 to open the discharge passage which results also in a pressure increase in cylinder 61 and, because of a reduced flow in line 84, in a decrease of pressure in cylinder 60.

Cylinder 60 is further in communication with connecting line 84 by an equalizer line 96 which includes a normally closed valve 97. The valve 97 is operatively connected to means sensing the operating condition of an engine coupled to the transmission and is opened in order to avoid stalling of the engine. The pressure in cylinders 60 and 61 is then equalized and the torque transmitted through the transmission is reduced by changing the transmission ratio toward reduced output speed. Such operating condition may be, for example, idling of the engine as in the upper end position of the gas pedal or an engine speed lower than a predetermined desired value. If the engine is for example a gasoline engine, the valve 97 could be connected for operation to the membrane of a vacuum chamber connected to the inlet manifold of the engine, such that the pressure increase which occurs in the inlet manifold before the stalling of the engine opens valve 97.

OPERATION OF THE ROTARY MOTION TRANSMITTING DEVICE

Rotation of the input shaft 15 and transmission of a torque through the device causes the loading cam structure 37 to force the input traction disc 21 toward the output traction disc 22 thereby frictionally engaging the power rollers 25 and 26 with both traction discs. Rotation of the input traction disc 21 in one direction causes rotation of the output traction disc 22 and the output shaft 16 in the opposite direction at a speed which depends on the angular position of the pivot shafts 50 and 51. Such engagement produces on each roller 25 and 26 large oppositely directed forces which are taken up by the pivot shafts and balanced through the tension sheets 53 and 54 without reaching the housing.

During operation when the power rollers are in firm engagement with the traction discs, pivoting of the pivot shaft is obtained by slight axial movement of the pivot shaft. Such axial movement moves the power rollers away from their neutral positions and causes them to walk to larger circles of engagement with one of the traction discs and to smaller circles of engagement with the other traction disc. This changes the position of the pivot shaft position indicator 87 thereby adjusting the servo valve piston 86 to cause axial return of the pivot shaft to its neutral position in which the power rollers remain in engagement with the traction rollers at the momentary circles of engagement i.e. at the momentary transmission ratio.

As pointed out earlier, the tension sheets 53 and 54 balance the radial forces exerted on the pivot shafts by the power rollers. They also take up and dampen the vibrations of the power rollers, which forces and vibrations are not passed on to the housing. Furthermore, the tension sheets permit frictionless axial movement of the pivot shafts 50 and 51 for changing the transmission ratio while large radial forces are effective on the pivot shafts.

A torque transmitted through the transmission creates at the points of engagement of each power roller with the traction discs reaction forces which are both directed in the direction of the pivot shaft. The axial forces on the pivot shaft are taken up by the axial pistons 56, 57 and the hydraulic fluid in each of the cylinders 60 and 61 which are maintained at variably different pressures depending on the torque transmitted by the power rollers 25 and 26.

The pivot shafts 50 and 51 are not firmly interconnected to avoid noise and vibration but are permitted to adjust to their proper positions independently. Independent movement of the pivot shafts 50 and 51 is however limited by the flexure band arrangement 68-72 which limits the freedom of relative motion of the pivot shafts 50 and 51 and resiliently forces them into their proper positions relative to each other.

Cam 65 is provided in order to stabilize the pivoting movement of the pivot shafts 50 and 51 by providing a definite position for the piston 56 for any transmission ratio setting. Such cams may be provided at both ends of each pivot shaft but are shown in the drawings only at one end. The pivoting forces provided by the piston and cam arrangement depends on the pressure applied to cylinder 60 which pressure normally depends on the torque transmitted by the traction rollers 25 and 26. This pressure may be maintained below a certain limit by a dump valve to avoid overloading of the traction rollers 25, 26.

In some cases, however, for example when a certain constant acceleration torque is to be supplied by the transmission the pressure limit must be varied depending on the pivot position of the pivot shafts, which position is sensed by indicator piston 76 which varies the loading of spring 78 and, accordingly, the pressure necessary to move the piston 78 to clear the dump valve opening 80.

To change the speed, that is, for example to increase the speed of the output shaft of the transmission a speed signal in the form of increased pressure is applied to piston 89 which against spring 92 moves lever 88 and with it piston 86 in a direction to close the outlet of control cylinder 86. This causes an increase in pressure in cylinder 61 and - as a result of continued draining - a decrease in pressure in cylinder 60 so that the pivot shaft 50 is moved axially into speed-up precessing direction so that the rollers are steered to a larger circle of engagement with the input traction disc 21 and to a smaller circle of engagement with the output disc 22 resulting in pivoting of the pivot shaft toward an increased speed transmission ratio as it is known in the field (see for example U.S. Pat. No. 3,087,348). When the higher desired speed is achieved, the speed signal is again reduced to its constant — speed value and piston 89 and lever 88 are returned to the normal position. The pivot shaft 50 also returns to its normal non-precessing axial position however remains in its higher speed transmission ratio position and therefore, the torque transmitted by the traction rollers is increased — assuming that the output shaft torque remains unchanged. The higher traction roller torque results in greater axial forces on the pivot shaft which have to be compensated by a greater pressure differential between cylinders 60 and 61. This greater pressure differential is obtained by slight movement of the transmission ratio operating member 87 in a direction to somewhat increase the tension of the spring 95 and thereby requiring a greater pressure in cylinder 85 to open its discharge to cylinder 60.

The invention, however, is not limited to the particular embodiments described herein. It is, for example, possible to interconnect the pivot shafts by restraining means which are, in themselves, somewhat resilient in order to resiliently force the pivot shafts into their proper relative angular positions and to limit their independent relative movement.

Further, precess pistons may be provided only at one end of the pivot shafts while springs may be provided at the other end of the pivot shafts and the axial force differential may be obtained by controlling the pressure acting on the pistons at the one end of the shafts. On the other hand, cams may be provided at both ends of the pivot shafts as already mentioned.

Also, the difference in forces applied to the pivot shaft in opposite axial directions may be simply controlled by a pressure relief valve if only overloading of the traction rollers is to be prevented, that is, if the torque transmitted through the traction rollers is to be limited to a predetermined value. The opening pressure of the relief valve, however, may be modified for example by the transmission ratio position of the pivot shafts with a view to obtaining a constant output shaft torque limit rather than a constant traction roller torque limit.

What is claimed is:

1. In combination with an infinitely variable traction roller transmission device comprising: coaxial input and output shafts oppositely disposed toric elements, one being supported by each of said shafts for rotation therewith; at least two motion transmitting rollers disposed between said toric elements in radial symmetry with respect to the axis of the input and output shafts; and means for forcing said toric elements toward each other to cause frictional engagement of the motion transmitting rollers with the opposed surfaces of the toric elements; a support structure for each of said rollers, each of said support structures including a pivot shaft having a pivot axis normal to a plane which includes the axis of the input and output shafts, restraining means interconnecting said pivot shafts and limiting independent pivoting of said pivot shafts, and resilient means associated with said restraining means for resiliently forcing said pivot shafts into the proper angular positions relative to each other.

2. A transmission as recited in claim 1, wherein opposite pivot shafts have flanges formed thereon and wherein said restraining means are cables extending around the flanges of one shaft in opposite directions and crossing over to the respective flanges of the opposite pivot shaft around which they extend in a direction opposite to that in which they extend around the respective flanges of the first shaft.

3. A transmission as recited in claim 2, wherein said cables have a predetermined slack so as to permit said independent pivoting of said pivot shafts within given limits and wherein means are provided for tensioning the cables so as to resiliently force the pivot shafts into their proper relative angular positions.

4. A transmission as recited in claim 3, wherein said tensioning means are tensioning guides acting on the cables in the center between the flanges and taking up the slack of said cables, said guides being spring biased in a direction essentially normal to the direction in which the cables extend.

5. In combination with an infinitely variable traction roller transmission device comprising: coaxial input and output shafts oppositely disposed toric elements, one being supported by each of said shafts for rotation therewith; at least two motion transmitting rollers disposed between said toric elements in radial symmetry with respect to the axis of the input and output shafts; means for forcing said toric elements toward each other to cause frictional engagement of the motion transmitting rollers with the opposed surfaces of the toric elements; a support structure for each of said rollers, each of said support structures including an axially movably supported pivot shaft having a pivot axis normal to a plane which includes the axis of the input and output shafts; and a hydraulically operable piston disposed at least at one end of each pivot shaft and capable of axially moving the pivot shaft in opposition to an axial force provided at the opposite end of the pivot shaft so as to cause precessing of said traction rollers in order to change the transmission ratio, an axial cam structure provided at said one end of the pivot shaft on which cam structure said piston acts so as to provide a definite axial piston for any transmission ratio setting.

6. A transmission as recited in claim 5, wherein the axis of said piston is inclined with respect to the pivot axis of the pivot shaft and is essentially normal to the cam surface of said cam structure.

7. A transmission as recited in claim 5, wherein a hydraulic piston is also provided at the opposite end of the pivot shaft to provide the axial force in opposition to the force applied by the hydraulically operated piston at the one end of the pivot shaft.

8. A transmission as recited in claim 7, wherein cam structures are provided at both ends of said pivot shafts, said pistons, acting on said pivot shaft in opposite axial directions and on said cam structures in the same pivoting sense.

9. In combination with an infinitely variable traction roller transmission device comprising: coaxial input and output shafts; oppositely disposed toric elements, one being supported by each of said shafts for rotation therewith; at least two motion transmitting rollers disposed between said toric elements in radial symmetry with respect to the axis of the input and output shafts; means for forcing said toric elements toward each other to cause frictional engagement of the motion transmitting rollers with the opposed surfaces of the toric elements; a support structure for each of said rollers, each of said support structures including an axially movably supported pivot shaft having a pivot axis normal to a plane which includes the axis of the input and output shafts; and a hydraulically operable piston disposed at least at one end of each pivot shaft and capable of axially moving the pivot shaft in opposition to an axial force provided at the opposite end of the pivot shaft; pressure control means for applying pressurized fluid to said piston, the pressure of fluid acting on said piston being dependent on the torque transmitted through said traction rollers; and pressure limiting means disposed in communication with said pressure control means for limiting the maximum pressure of the pressurized fluid acting on said piston.

10. A transmission as recited in claim 9, wherein means are provided for varying the pressure limit provided by said pressure limiting means dependent on the angular position of the pivot shafts.

11. A transmission as recited in claim 10, wherein said pressure control means is a spring loaded pressure relief piston valve operated by the pressurized fluid and said means for varying the pressure limit are means so operatively associated with said pivot shaft as to vary the tension of said spring dependent on the angular position of said pivot shaft.

12. In combination with an infinitely variable traction roller transmission comprising in a support frame coaxial input and output shafts oppositely disposed toric elements, one being supported by each of said shafts for rotation therewith; at least two motion transmitting rollers disposed between said toric elements in radial symmetry with respect to the axis of the input and output shafts; means for forcing said toric elements toward each other to cause frictional engagement of the motion transmitting rollers with the opposed surfaces of the toric elements; and a support structure for each of said rollers, each of said support structures including a pivot shaft having a pivot axis normal to a plane which includes the axis of the input and output shafts, a bearing structure for pivotally supporting the pivot shafts; U-shaped tension sheets having a bight portion extending between the toric elements and interconnecting said bearing structures to balance the forces exerted on the opposed rollers and their end portions mounted to said frame, said tension sheets being flexible so as to permit axial movement of said pivot shafts, and means for axially moving said pivot shafts out of their normal positions so as to cause precessing of said traction rollers resulting in a change of the transmission ratio.

13. A transmission as recited in claim 12, wherein said pivot shafts are functionally interconnected by restraining means which limit independent relative pivoting of said pivot shafts and resilient means are associated with said restraining means for resiliently forcing said pivot shafts into the proper angular positions relative to each other.

14. A transmission as recited in claim 13, wherein a hydraulically operable piston is disposed at least at one end of each pivot shaft and capable of axially moving the pivot shaft in opposition to an axial force provided at the opposite end of the pivot shaft so as to cause precessing of said traction rollers in order to change the transmission ratio, said one end of the pivot shaft being provided with a cam structure on which said piston acts so as to provide a definite piston position for any transmission ratio setting.

15. A transmission as recited in claim 14, wherein pressure control means are provided for applying pressurized fluid to said piston, the pressure of the fluid acting on said piston being dependent on the torque transmitted through said traction rollers; and pressure limiting means disposed in communication with said pressure control means for limiting the pressure of the pressurized fluid acting on said piston.

* * * * *